UNITED STATES PATENT OFFICE.

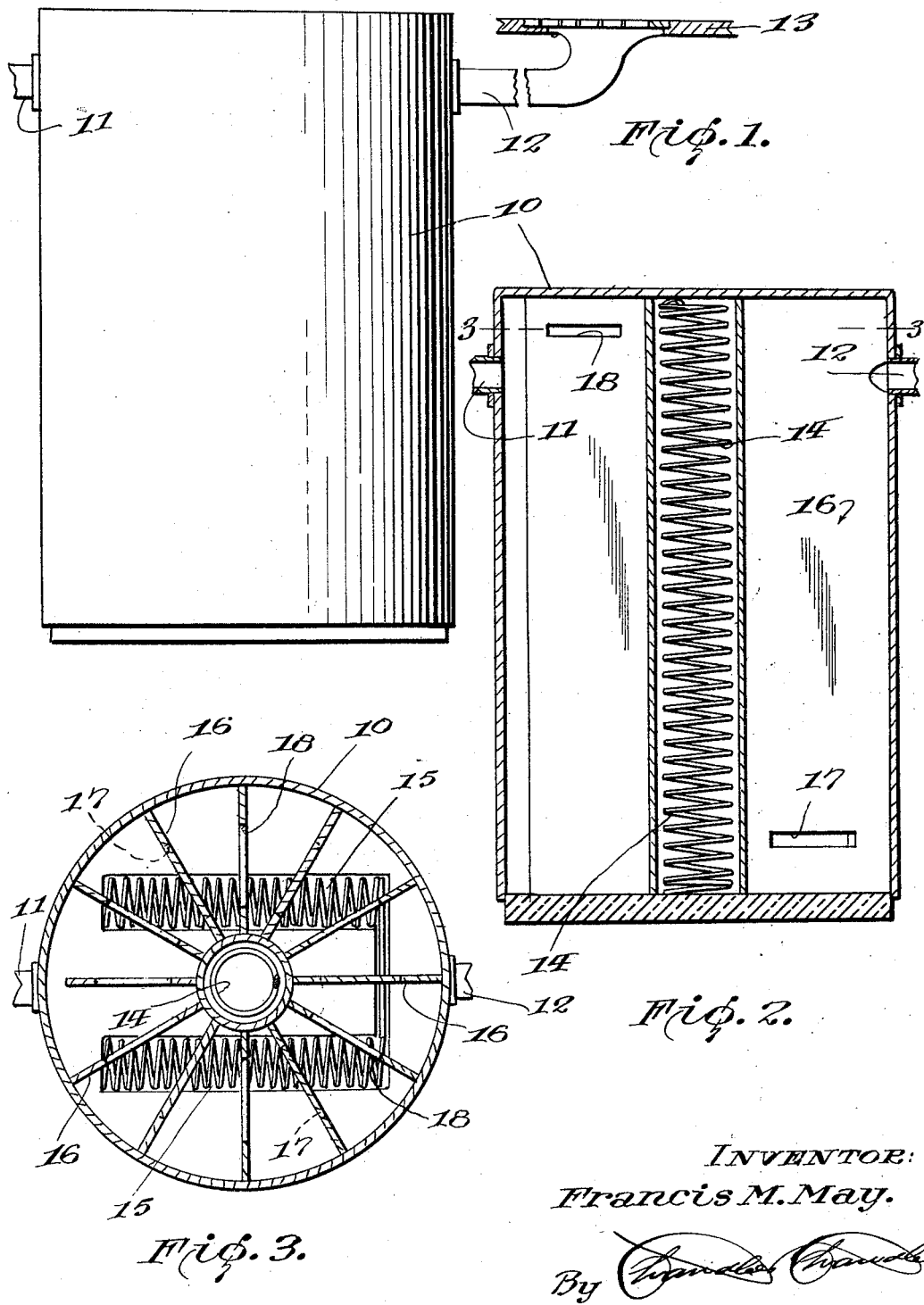

FRANCIS M. MAY, OF LOUISVILLE, KENTUCKY.

ELECTRIC HEATER.

1,416,225.  Specification of Letters Patent.  Patented May 16, 1922.

Application filed June 13, 1921. Serial No. 477,242.

*To all whom it may concern:*

Be it known that I, FRANCIS M. MAY, a citizen of the United States, residing at Louisville, in the county of Jefferson, State of Kentucky, have invented certain new and useful Improvements in Electric Heaters; and I do hereby declare the following to be a full, clear, and exact description of the invention, such as will enable others skilled in the art to which it appertains to make and use the same.

This invention relates to heaters and particularly to heaters for electric street cars.

One object of the invention is to provide a heater through which air is forced, for the purpose of heating said air, the air escaping into the interior of the car.

Another object is to provide a heater of such construction that the air must travel through a long and circuitous passage, in contact with a highly heated surface, so that the escaping air will be raised to a sufficient temperature to properly heat the interior of a street car.

Other objects and advantages will be apparent from the following description when taken in connection with the accompanying drawing.

In the drawing:

Figure 1 is an elevation of a heater made in accordance with the invention.

Figure 2 is a vertical transverse central sectional view through the heater.

Figure 3 is a horizontal central sectional view through the heater.

Referring particularly to the accompanying drawing, 10 represents a cylindrical casing which is closed at its upper and lower ends, and has connected to one side, near its upper end, a pipe 11 through which air enters the casing from a source of compressed air supply, while a second pipe 12, is similarly connected to the upper portion of the side at a point diametrically opposite to the pipe 11, for delivering the heated air from the casing to the point of use, which may be the hot air register 13, located in the floor or other suitable part of the car.

Disposed vertically and centrally in the casing 10 is a heating resistance element 14, and disposed in the bottom of the casing is a second heating element 15, the same being properly connected to a source of electric current supply. Radiating from the center of the casing, and being secured to the outer wall thereof, are the vertical walls 16, the same being regularly spaced apart. Every one of the walls 16 is secured to the upper and lower ends of the casing, and in each alternate wall, adjacent its lower end there is formed an opening 17, and in every other alternate wall there is formed a similar opening 18, adjacent the upper end thereof. Thus the air, as it passes through the casing, must pass downwardly between a pair of walls 16, through a lower opening, thence upwardly and into the next compartment, through an upper opening, with the result that the air passes through a circuitous route, and finally escapes through the delivery pipe 12, to the point to be heated.

While I have mentioned the supply of air as emanating from a compressed air source, I wish it understood that the air may be forced through the heater by other means, such as a pump, blast fan, or the like, with equally beneficial results.

What is claimed is:

1. An electrical heater comprising a casing closed at both ends, baffle walls in the casing having openings alternately at the upper and lower ends, an electric heating element disposed vertically and centrally within the casing, an electric heating element in the bottom of the casing, means for delivering a current of air into the casing to pass upwardly and downwardly of the baffle walls and through the openings thereof, and means for conducting the heated air from the casing to a point of use.

2. An electric heater comprising a casing, a heating element in the casing, a tortuous passage formed in the casing around the heating element, means for delivering air to one end of the passage, and means for delivering heated air from the other end of the passage.

In testimony whereof, I affix my signature, in the presence of two witnesses.

FRANCIS M. MAY.

Witnesses:
ESTHER DENZINGER,
L. F. SPECKMAN.